United States Patent [19]

Fukuda et al.

[11] Patent Number: 5,142,375
[45] Date of Patent: Aug. 25, 1992

[54] VIDEO CAMERA INTEGRAL WITH MAGNETIC RECORDING AND REPRODUCING DEVICE, AND WITH COLOR VIDEO SIGNAL PROCESSING APPARATUS

[75] Inventors: Tokuya Fukuda, Tokyo; Takayuki Sasaki, Kanagawa, both of Japan

[73] Assignee: Sony Corporation, Tokyo, Japan

[21] Appl. No.: 411,863

[22] Filed: Sep. 25, 1989

[30] Foreign Application Priority Data

Sep. 27, 1988 [JP] Japan .................... 63-241368
Sep. 28, 1988 [JP] Japan .................... 63-243341

[51] Int. Cl.⁵ ............................ H04N 9/79
[52] U.S. Cl. ...................... 358/310; 358/330; 358/326; 358/906
[58] Field of Search ............. 358/31, 326, 310, 327, 358/328, 314, 906, 909, 329; 360/33.1, 36.1

[56] References Cited

U.S. PATENT DOCUMENTS 4,613,909 9/1986 Tobe .................... 358/314 X
4,737,862 4/1988 Koga .................... 358/329

FOREIGN PATENT DOCUMENTS 9106682 8/1983 Australia .

OTHER PUBLICATIONS

Patent Abstracts of Japan, vol. 13, No. 074 (E-717) Feb. 20, 1989 & JP-A-63 256078 (Canon) Oct. 24, 1988.
Patent Abstracts of Japan, vol. 13, No. 074 (E-717) Feb. 20, 1989 & JP-A-63 256076 (Canon) Oct. 24, 1988.

*Primary Examiner*—Robert L. Richardson
*Attorney, Agent, or Firm*—Alvin Sinderbrand; William S. Frommer

[57] ABSTRACT

A video camera having an imager providing an imager signal corresponding to an object in the field of view of the camera, and an integral magnetic recording and reproducing device are provided with a video signal processing apparatus including an imager signal processing circuit having a delay circuit for delaying the imager signal and from which a luminance signal and a chrominance signal are produced, a recording circuit for recording the luminance and chrominance signals on a magnetic tape or other medium, and a reproducing circuit for reproducing the luminance and chrominance signals from the magnetic medium with at least one of the reproduced signals being applied to the delay device and with a composite video signal being obtained from the output of such delay device.

8 Claims, 3 Drawing Sheets

VIDEO CAMERA INTEGRAL WITH MAGNETIC RECORDING AND REPRODUCING DEVICE, AND WITH COLOR VIDEO SIGNAL PROCESSING APPARATUS

BACKGROUND OF THE INVENTION

1. Field of the Invention

This invention relates generally to apparatus for processing a color video signal and, more particularly, is directed to a color video signal processing apparatus which is suitable for application to an integrally combined video camera and a video tape recording and reproducing device.

2. Description of the Prior Art

In a known video tape recorder (VTR) capable of playback or reproduction and being integrally combined with a video camera, an imager signal obtained from an imager device of the camera, such as, a charge-coupled device (CCD), in the recording mode, and a reproduced signal obtained from the head or heads of the VTR in the reproducing or playback mode are independently processed by a camera block and a VTR block. An imager signal processing circuit included in the camera block for processing an imager signal in the recording mode is provided with a delay line having a delay time of more than 1 horizontal period (1H) to process a signal with respect to a vertical direction of a carrier chrominance signal, and to control an aperture of a luminance signal. On the other hand, a reproduced signal processing circuit for processing a reproduced signal in the playback mode is provided in the VTR block and includes a delay line having a delay time of more than 1 horizontal period for cancelling crosstalk components or noise of the reproduced luminance and carrier chrominance signals and for forming a dropout compensating circuit.

Imager signal processing circuits which require a delay line as the line memory are those having a so-called complementary color checkered filter and an aperture control circuit. Reference is made to U.S. Pat. No. 4,731,674, issued Mar. 15, 1988, and having a common assignee herewith, as disclosing an arrangement in which a luminance signal and a carrier chrominance signal are added to each other, supplied through a single comb filter, and again separated into a luminance signal and a carrier chrominance signal.

In the prior art video tape recorders integrally combined with built-in cameras and having a reproducing or playback mode, as described above, the imager signal processing circuit and the reproduced signal processing circuit are provided with respective delay lines each having a delay time of more than one horizontal period, whereby the circuit arrangement of the apparatus has a relatively increased number of delay lines. As a result of the foregoing, the circuit arrangement is complicated and cannot be readily miniaturized. Furthermore, the video tape recorder with an integral or built-in video camera is inherently expensive and consumes an undesirably large amount of power.

Moreover, in the known color video signal processing apparatus for use with a video tape recorder integrally combined with a built-in video camera and capable of a playback mode, a relatively complicated circuit is required for processing a carrier chrominance signal according to the color-undersystem, that is, in which the carrier chrominance signal is frequency converted to a low band below the band of the frequency modulated luminance signal. More particularly, such color video signal processing apparatus requires a considerably increased number of memories in order to effect the analog-to-digital conversion of the chrominance signal in the form of a color subcarrier which is 3.58 or 4.43 MHz, for the NTSC or PAL system, respectively. Moreover, such signal processing cannot be applied to various features of the video tape recorder, such as, the variable tape speed playback and the like.

OBJECTS AND SUMMARY OF THE INVENTION

Accordingly, it is an object of the present invention to provide an improved color video signal processing apparatus which avoids the above-mentioned defects encountered with the prior art.

More specifically, it is an object of the present invention to provide a color video signal processing apparatus having a relatively simple circuit arrangement and particularly suited for use with a video tape recorder integrally combined with a built-in video camera and having a reproducing or playback mode, and which has a relatively simple circuit arrangement that includes a delay line and/or an encoder used in both the reproducing and playback modes.

Another object of this invention is to provide a color video signal processing apparatus, as aforesaid, in which the circuit arrangement can be readily miniaturized.

A further object of the present invention is to provide a color video signal processing apparatus, as aforesaid, and which is adapted to have its manufacturing cost and power consumption reduced.

It is still another object of this invention to provide a color video signal processing apparatus, as aforesaid, in which the storage capacity of a memory included therein can be reduced.

It is still a further object of the present invention to provide a color video signal processing apparatus, as aforesaid, for a video tape recorder having a built-in camera and which is applicable to various features of the video tape recorder, such as, a variable tape speed playback mode and the like.

It is still another object of the present invention to provide a color video signal processing apparatus, as aforesaid, for a video tape recorder integrally combined with a built-in video camera, and in which a frequency-converting circuit for converting a carrier chrominance signal into a low-band chrominance signal can be eliminated.

According to an aspect of this invention, a video camera having imager means providing an imager signal corresponding to an object in a field of view of the camera, is integrally combined with a magnetic recording and reproducing device, and with apparatus for processing a color video signal which comprises; imager signal processing means for processing the imager signal and including delay means for delaying the imager signal, and means for producing a luminance signal and a chrominance signal from the output of the delay means; means operative in a recording mode for recording the luminance and chrominance signals on a magnetic medium; and means operative in a reproducing mode for reproducing the luminance and chrominance signals from the magnetic medium, applying at least one of the luminance and chrominance signals to the delay means and obtaining a composite video signal from the output of such delay means.

In accordance with a feature of this invention, the imager signal processing means includes encoder means which is selectively operative in the recording and reproducing modes to encode the chrominance signal with a carrier having a frequency in a low band below that of the frequency modulated luminance signal with which the low band carrier chrominance signal is recorded, and with a standard color subcarrier, for example, of 3.58 or 4.43 MHz, as used in the NTSC or PAL systems, respectively. Thus, the encoder means may function as a part of the imager signal processing means in the recording mode and as a part of a reproduced signal processing means in the reproducing mode.

The above, and other objects, features and advantages of the present invention, will be apparent in the following detailed description of preferred embodiments when read in conjunction with the accompanying drawings in which corresponding parts are identified by the same reference numerals in the several views.

DETAILED DESCRIPTION OF PREFERRED EMBODIMENTS

Figure 1:
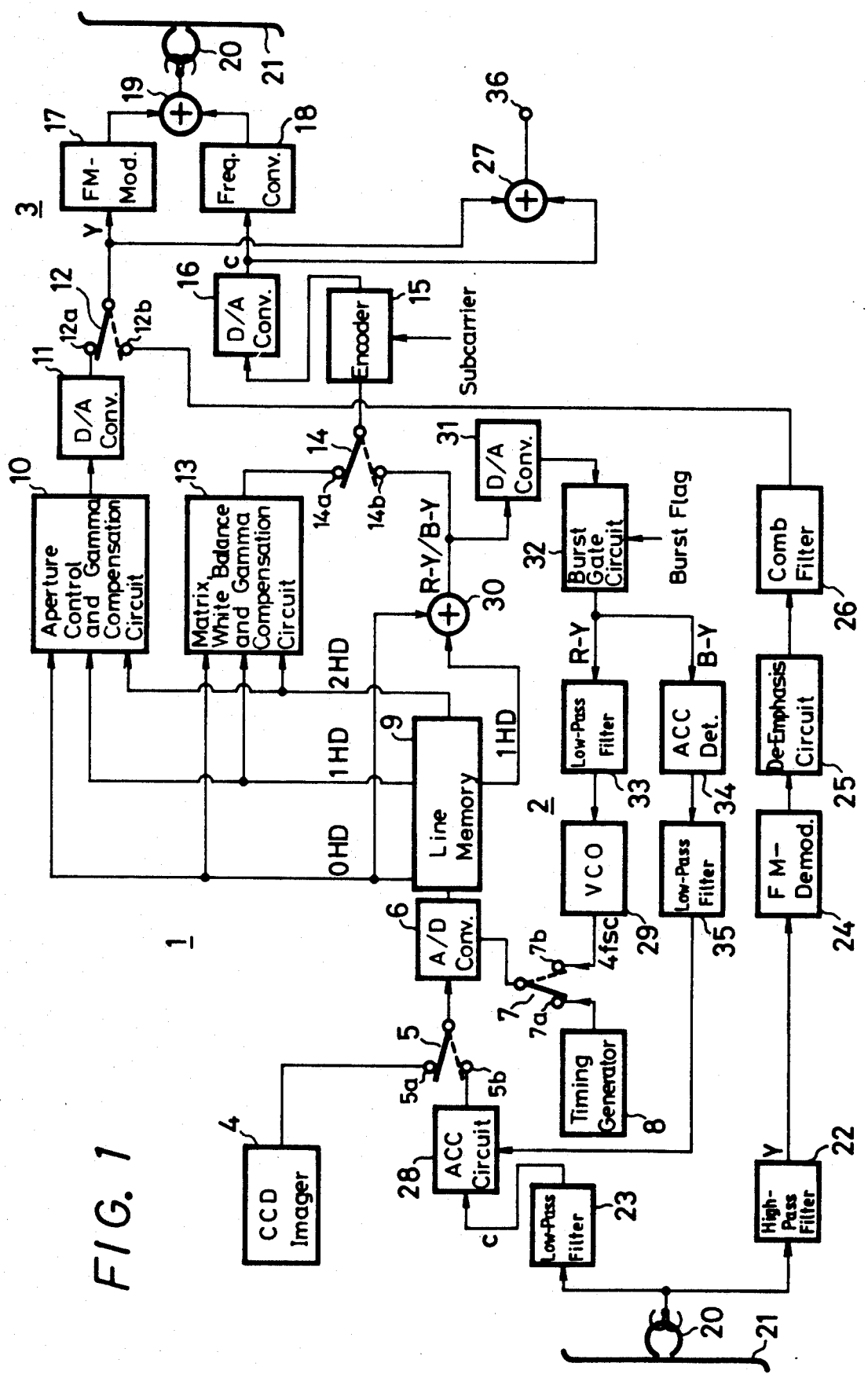
FIG. 1 is a block diagram illustrating a color video signal processing apparatus according to an embodiment of the present invention.

Referring initially to FIG. 1, it will be seen that, in a video tape recorder integrated with a camera and having reading and reproducing modes, an apparatus for processing a color video signal according to an embodiment of the present invention generally comprises an imager signal processing circuit 1, a reproduced signal processing circuit 2 and a video signal recording circuit 3.

In a recording mode of the apparatus, an imager signal from an imager or image pick-up device 4 of the camera, which may be in the form of a charge couple device (CCD), is supplied through a contact 5a of a switch 5, which is then in the position shown in full lines, to an analog-to-digital (A/D) converter 6 in which the imager signal is converted from an analog signal to a corresponding digital signal. A switch 7, which is in the position shown in full lines on FIG. 1 when the apparatus is in the recording mode, is then operative to supply to the A/D converter 6, as a sampling clock signal, a timing signal fed from a timing generator 8 to a contact 7a of the switch. The resulting digital signal from the A/D converter 6 is supplied to a line memory 9 which passes the same without change as a through-signal (0HD), and which further acts on the digital signal to provide a 1H delayed signal (1HD) and a 2H delayed signal (2HD), where H represents a horizontal period. Such signals (0HD), (1HD) and (2HD) are supplied to a circuit 10 which, on the basis thereof, provides an aperture-controlled luminance signal which is then gamma-compensated. The aperture-controlled and gamma-compensated luminance signal is applied to a digital-to-analog (D/A) converter 11 which provides a corresponding analog luminance signal supplied to a contact 12a of a switch 12 which is in the position shown in full lines in the recording mode of the apparatus.

The through-signal (0HD), the 1H delayed signal (1HD) and the 2H delayed signal (2HD) are also supplied from the line memory 9 to a circuit 13 in which a color separator or matrix forms an interpolated signal from upper and lower lines of a carrier chrominance signal and, on the basis of such interpolated signal, provides separated primary color signals R, G and B. The circuit 13 is further effective to provide white balance adjustment of the separated primary color signals, as well as gamma-compensation thereof. The signal thus processed is supplied from the circuit 13 to a contact 14a of a switch 14 positioned, as shown in full lines on FIG. 1, in the recording mode of the apparatus. Thus, in the recording mode, the processed signal is supplied from circuit 13 to an encoder 15 for modulating and encoding a subcarrier signal having a frequency of 3.58 MHz, in the case of an NTSC signal, or 4.43 MHz, in the case of a PAL signal. The resulting carrier chrominance signal is supplied from encoder 15 to a digital-to-analog converter 16 which produces a corresponding analog carrier chrominance signal.

In the video signal recording system 3, the luminance signal Y and the carrier chrominance signal C from the imager signal processing circuit 1 are supplied to an FM-modulating circuit 17 and a frequency converting circuit 18, respectively. In the FM-modulating circuit 17, the luminance signal Y received through the switch 12 from the D/A converter 11 in the recording mode frequency modulates a carrier whose frequency is shifted by $\frac{1}{2} f_H$ at each field of the video signal, with $f_H$ representing the horizontal or line frequency of the video signal. The resulting FM-luminance signal is supplied from the FM-modulating circuit 17 to one input of an adding circuit 19. On the other hand, the carrier chrominance signal supplied to the frequency converting circuit 18 is frequency-converted in the latter to the low band side of the FM-luminance signal so that, for example the frequency of the subcarrier signal is changed from 3.58 MHz, in the case of the NTSC system, to about 743 kHz, as in the case of the so-called 8 mm video tape recorder. In down-converting the carrier chrominance signal, the frequency converting circuit 18 uses the well known phase shift or phase inversion technique for a purpose hereinafter described.

The low band converted carrier chrominance signal from the frequency converting circuit 18 is supplied to another input of the adding circuit 19 and the output of the latter, which is comprised of the FM-luminance signal and the low band converted carrier chrominance signal, is supplied to a rotary magnetic head 20 for recording by the latter in successive slant tracks on a magnetic tape 21, with each slant track containing one field of the video signal. The rotary head 20 is desirably one of two rotary heads (not shown) which are diametrically opposed to each other on a rotary tape guide drum. The rotary head 20 is rotated so as to effect one revolution during each frame period, and the magnetic tape 21 is obliquely wrapped around the peripheral surface of the rotary drum to a suitable angular extent and is transported at a predetermined recording speed in a longitudinal direction.

In a reproducing or playback mode of the apparatus, a signal recorded in a slant track on the magnetic tape is reproduced by the rotary head 20 as it scans along such track. The resulting reproduced signal is comprised of a main signal including an FM-luminance signal and a low band converted carrier chrominance signal recorded in the scanned track, and also crosstalk luminance and chrominance components from the adjacent tracks. However, by reason of the previously described shifting, by ¼ $f_H$, of the carrier frequency of the FM-luminance signal at every field, and also by reason of the previously described use of the phase inversion or phase shift technique in the frequency converting circuit 18, the luminance and chrominance crosstalk components from the adjacent tracks are frequency-interleaved with the FM-luminance and the low band converted carrier chrominance signals reproduced from the main or scanned track.

The signal reproduced from a slant track on the magnetic tape 21 by the rotary head 20 in the reproducing mode of the apparatus is supplied to a high-pass filter 22 in the reproduced signal processing circuit 2 in order to derive the FM-luminance signal Y from the high-pass filter 22. The reproduced signal is also supplied from the head 20 to a low-pass filter 23 which derives the low-band converted carrier chrominance signal C. The FM-luminance signal Y from the high-pass filter 22 is FM-demodulated by an FM-demodulator 24 to provide a demodulated luminance signal which includes a crosstalk component from the tracks adjacent the track being scanned. Such luminance signal is supplied from the demodulator 24 through a deemphasis circuit 25 to a comb-filter 26 in which the crosstalk component of the luminance signal is eliminated. In the reproducing or playback mode of the apparatus, the several switches 5, 7, 12 and 14, which may be ganged, are changed over to the positions shown in broken lines on FIG. 1. Hence, the luminance signal, from which the crosstalk component of the luminance signal has been eliminated, is supplied from the comb-filter 26 through the switch 12 by way of the contact 12b of the latter and then to one input of an adding circuit 27.

The low-band converted carrier chrominance signal C from the low-pass filter 23 is level-controlled by an automatic chrominance control (ACC) circuit 28 to provide a carrier chrominance signal of a predetermined level which is supplied through a contact 5b of the switch 5 to the A/D converter 6 in which it is converted to a digital signal. In the reproducing or playback mode, the A/D converter 6 utilizes, as a sampling clock, a clock signal supplied thereto by way of a contact 7b of the switch 7 from a voltage-controlled oscillator (VCO) 29. The clock signal supplied from the VCO 29 has a frequency of 4 $f_{sc}$ which is locked, for example, to a reproduced subcarrier frequency $f_{sc}$. Accordingly, the A/D converter 6 alternately provides decoded red and blue difference chrominance signals R-Y and B-Y, that is, base band signals. These base band signals are supplied to line memory 9 which, with an adding circuit 30, forms a comb-filter in the reproduced signal processing circuit 2. More particularly, the base band signals are supplied directly, that is, without delay, from the A/D converter 6 to one input of the adding circuit 30 and, with a H delay, from the line memory 9 to the other input of the adding circuit 30. By reason of the foregoing, crosstalk components are eliminated from the base band signals.

The output of the adding circuit 30, that is, the base band signals from which the crosstalk components have been eliminated, is digital-to-analog converted by a D/A converter 31 and is then gated by a burst gate circuit 32. The red difference chrominance signal R-Y obtained from the circuit 32 as a pass error component of a burst signal is supplied through a low-phase filter 33 as a control signal for the VCO 29, thereby modulating the clock signal supplied from the latter as a sampling clock for the A/D converter 6. Thus, a so-called automatic phase control (APC) loop is provided. The burst signal from the burst gate circuit 32 is also detected by an ACC detecting circuit 34 as amplitude information which is supplied through a low-pass filter 35 to provide a control signal for the ACC circuit 28 for maintaining the burst signal at a predetermined level.

In the reproducing mode of the apparatus, the output signal from the adding circuit 30 of the comb filter is also supplied through a contact 14b of the switch 14 to the encoder 15 in which the previously employed subcarrier frequency of 3.58 MHz, in the case of a NTSC signal, or 4.43 MHz, in the case of a PAL signal, is recovered by modulating the corresponding subcarrier. The encoded signal from the encoder 15 is digital-to-analog converted by the D/A converting circuit 16, and the resulting analog carrier chrominance signal C is applied to another input of the adding circuit 27. Thus, the adding circuit 27 provides, as its output, a color video signal comprised of the luminance signal Y from the switch 12 and the carrier chrominance signal C from the converter 16, and such color video signal is provided at an output terminal 36.

It will be appreciated that, in the above described apparatus according to the present invention, the line memory 9 in the imager signal processing circuit 1 also serves as part of the comb filter of the reproduced signal processing circuit 2, with the result that the color video signal processing apparatus can be relatively simplified, and reduced in both size and cost. Further, the power consumed by the apparatus can be considerably reduced.

It is also to be seen that the encoder 15 in the imager signal processing circuit 1 also serves as a frequency converter for frequency converting the carrier chrominance signal in the reproduced signal processing circuit 2 so that, once again, the color video signal processing apparatus according to the invention can be relatively simplified and reduced in both size and cost.

Furthermore, since the reproduced carrier chrominance signal which is decoded, A/D-converted and supplied to the comb filter which includes the line memory 9 is a low band signal, it is possible to reduce the sampling frequency employed in the A/D converter 6. Thus, the storage capacity of the line memory 9 can be reduced, for example, to about ¼ of the storage capacity that would be required if the reproduced carrier chrominance signal was supplied to the low pass filter 23 in the form of the subcarrier. Moreover, since the carrier chrominance signal is A/D converted and is digitally processed, irregularities in the phase and amplitude of such signal can be prevented, and the color video signal processing apparatus according to the invention can be made to avoid the need for adjustment.

Figure 2:
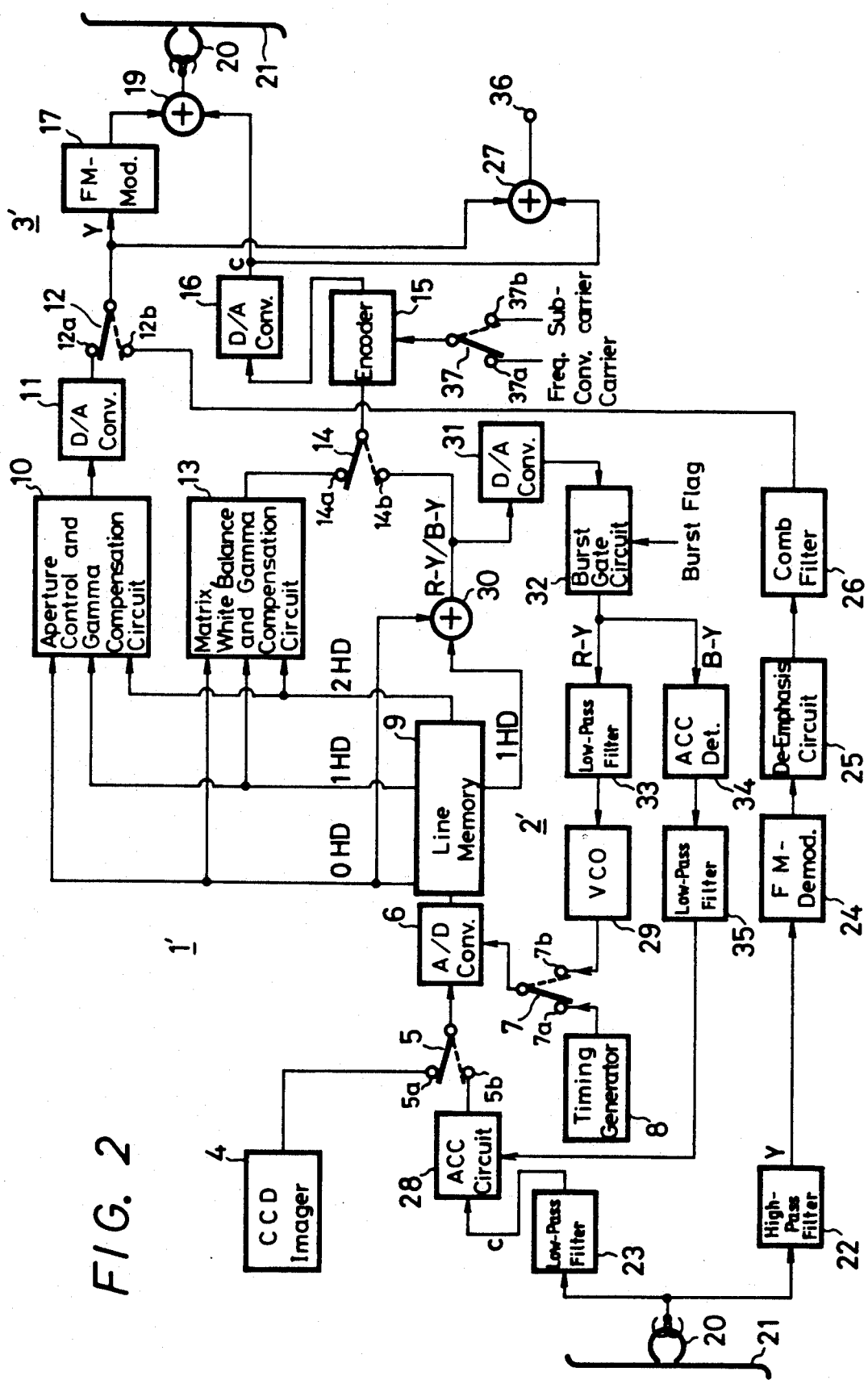
FIG. 2 is a block diagram showing a color video signal processing apparatus according to another embodiment of the present invention.

Referring now to FIG. 2, it will be seen that, in an apparatus for processing a color video signal according to another embodiment of the present invention, and in which parts corresponding to those described above with reference to FIG. 1 are identified by the same reference numerals and will not be further described at this time, the subcarrier supplied to the encoder 15 is changed for recording and reproducing operations, respectively. More specifically, in the apparatus of FIG. 2, a switch 37 is connected to the encoder 15 and is changed-over to selectively engage its contacts 37a and 37b when the apparatus is in its recording mode and reproducing mode, respectively. A low band converted carrier signal, for example, of 734 kHz in the event that the camera is integrally combined with an 8 mm video tape recorder, is supplied to the contact 37a, while a subcarrier signal having a frequency of 3.58 MHz, in the case of an NTSC signal, or a frequency of 4.43 MHz, in the case of a PAL signal, is supplied to the contact 37b. It will be appreciated that, in the apparatus of FIG. 2, when the encoder 15 is included in the imager signal processing circuit 1', the low band converted carrier signal supplied to the contact 37a of the switch 37 is directly modulated by the carrier chrominance signal supplied through the switch 14 to the encoder 15 in the recording mode to permit elimination of the frequency converting circuit 18 provided in the apparatus of FIG. 1 for low band converting of the carrier chrominance signal.

Apart from the fact that the low band converted carrier chrominance signal is directly supplied to the encoder 15 of the imager signal processing circuit 1' so as to be directly modulated by the carrier chrominance signal in the recording mode of the apparatus, it will be appreciated that the operation of the apparatus illustrated in FIG. 2 is substantially the same as that described above with reference to FIG. 1.

Although only the reproduced carrier chrominance signal is decoded and then fed to the line memory 9 through the low-pass filter 23, the ACC circuit 28, the switch 5 and the A/D converter 6 in the reproducing mode of the apparatus shown in each of FIGS. 1 and 2, it will be appreciated that the reproduced luminance signal, after being demodulated in the FM-demodulator 24, may be supplied to the line memory 9 in place of the decoded reproduced carrier chrominance signal, or that both signals, that is, the reproduced carrier chrominance signal, after being decoded, and the reproduced luminance signal, after being demodulated, may be supplied to the line memory 9.

Further, although the 1H delayed signal (1HD) is supplied from the line memory 9 to the adding circuit 30 in the reproducing mode of each of the embodiments of this invention illustrated in FIGS. 1 and 2, it is possible to substitute the 2H delayed signal (2HD) from the line memory 9 for the 1H delayed signal supplied to the adding circuit 30 in the reproducing mode.

Since the embodiment of the invention illustrated in FIG. 2 also uses the line memory 9 and the encoder 15 in both the imager signal processing circuit 1' and the reproduced signal processing circuit 2', such embodiment is also endowed with the advantages previously noted for the embodiment of FIG. 1, in that the circuit arrangement of the color video signal processing apparatus of FIG. 2 can be simplified and its size, cost and power consumption can all be reduced. Such advantages are even enhanced in the embodiment of FIG. 2 by the elimination of the frequency converter 18 therefrom.

Once again, in the case of the embodiment illustrated in FIG. 2, since the reproduced carrier chrominance signal is decoded and fed to the line memory 9 in the form of base band signals, the storage capacity of the line memory 9 can be economically reduced and the color video signal processing apparatus according to the embodiment of this invention shown on FIG. 2 can be applied with ease to VTRs having various functions or features in addition to the standard recording and reproducing modes, such as, for example, a variable tape speed playback mode and the like.

Figure 3:
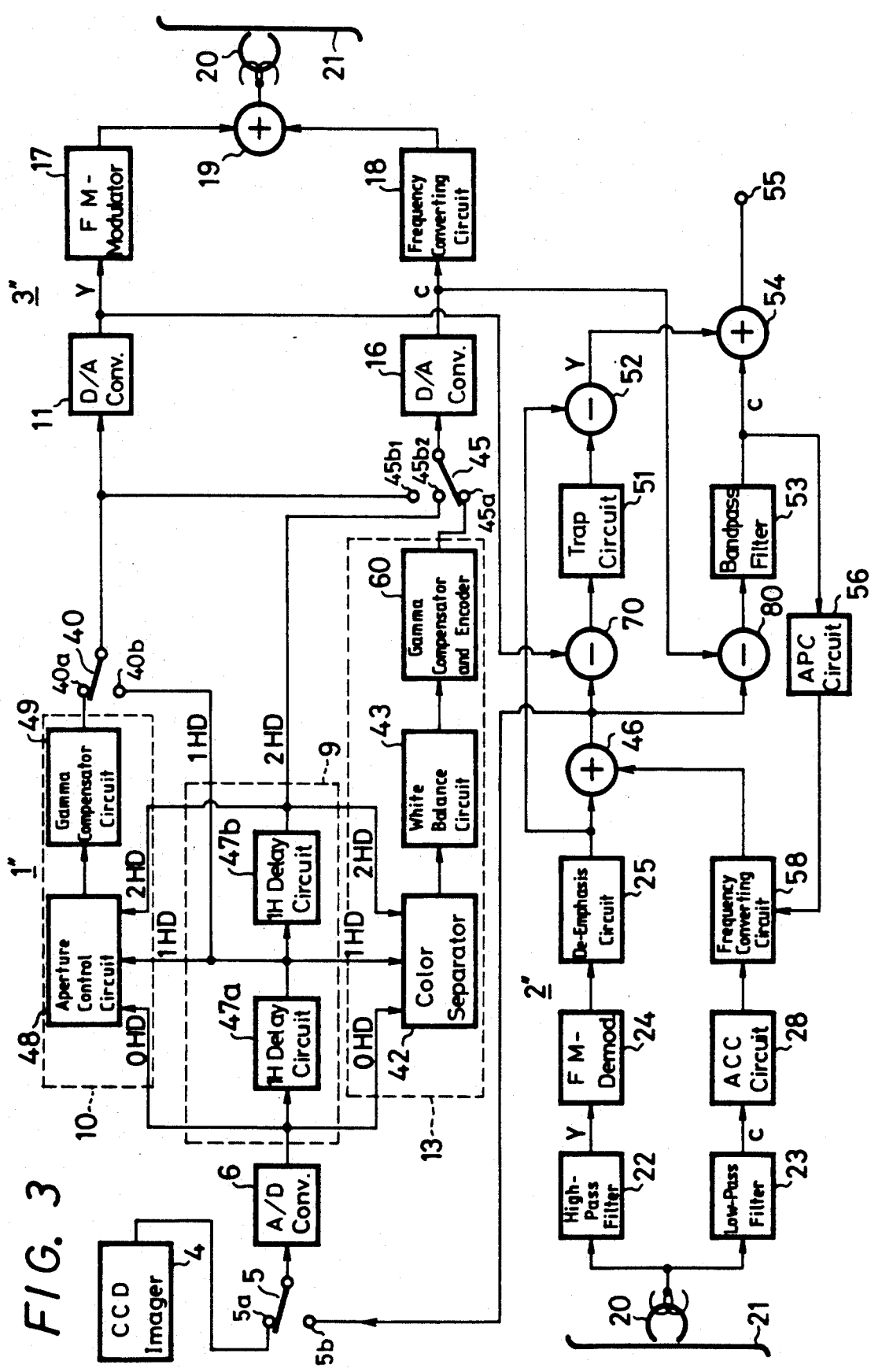
FIG. 3 is a block diagram showing a color video signal processing apparatus according to still another embodiment of the present invention.

Referring now to FIG. 3, it will be seen that, in an apparatus for processing a color video signal according to still another embodiment of the present invention, and in which parts corresponding to those described above with reference to FIG. 1 or FIG. 2 are identified by the same reference numerals and will not be further described at this time, the line memory 9 is comprised of a plurality of 1H delay circuits 47a and 47b. In the recording mode of the apparatus shown on FIG. 3, the imager signal from the CCD imager 4 is supplied through the contact 5a of the switch 5 to the A/D converter 6 and is thereby A/D-converted to a digital signal which is applied to the input of the 1H delay circuit 47a, and which also forms the through-signal (0HD). The output of the 1H delay circuit 47a, at which the 1H delayed signal (1HD) is derived, is connected to the input of the 1H delay circuit 47b, and the 2H delayed signal (2HD) is derived from the output of the delay circuit 47b. The through-signal (0HD), and the 1H delayed signal (1HD) and 2H delayed signal (2HD) are all supplied to an aperture control circuit 48 shown to be included within the circuit 10 and being operative to form an aperture control signal for effecting aperture control of the luminance signal. The output signal from the aperture control circuit 48 is supplied to a gamma compensator 49 also included within the circuit 10, and in which it is gamma-compensated before being applied to a contact 40a of a switch 40. The switch 40 is in the position shown in full lines on FIG. 3 in the recording mode so as to supply the output of the gamma compensator circuit 49 to the D/A converter 11 for providing an analog luminance signal Y at the output of the latter.

The through-signal (0HD), the 1H delayed signal (1HD) and the 2H delayed signal (2HD) from the line memory 9 are also supplied to a color separating circuit 42 included in the circuit 13 and which is operative to provide an interpolated signal from upper and lower lines of a carrier chrominance signal, and then to provide separated primary color signals R, G and B on the basis of such interpolated signal. The circuit 13 is further shown to include a white balance circuit 43 which adjusts the white balance of the primary color signals R, G and B from the color separating circuit 42, and a gamma-compensator and encoder circuit 60 in which the primary color signals are gamma-compensated and encoded to provide a signal according to the NTSC or PAL system. The resulting encoded signal is supplied from the circuit 60 to a contact 45a of a switch 45 which, in the recording mode of the apparatus is in the position shown on FIG. 3 so as to supply the encoded signal to the D/A converter 16 which provides an analog carrier chrominance signal C. The luminance signal Y and the carrier chrominance signal C derived from the imager signal processing circuit 1" are respectively supplied to the FM-modulating circuit 17 and the frequency converting circuit 18 in the video signal recording system 3".

The luminance signal Y supplied to the FM-modulating circuit 17 frequency modulates a carrier which has its frequency shifted by $\frac{1}{2} f_H$ at each field of the video signal so that, the FM-luminance signal included in a main signal being reproduced from a track on the magnetic tape will be frequency-interleaved with the crosstalk components of the FM-luminance signal reproduced from adjacent tracks. The FM-luminance signal from the FM-modulating circuit 17 is supplied to one input of the adding circuit 19.

The carrier chrominance signal C supplied to the frequency converting circuit 18 is frequency-converted in the latter to the low band side of the FM-luminance signal so that, for example, the color subcarrier frequency changes from 3.58 MHz, when the signal is in accordance with the NTSC system, to about 743 kHz, in the case where a so-called 8 mm video tape recorder is integrated with the camera. Furthermore, through the use of the so-called phase-inversion (PI) or phase shift (PS) technique, the low band converted carrier chrominance signal included in the main signal being reproduced from a track is frequency-interleaved with respect to the crosstalk component of the low band converted carrier chrominance signal from the adjacent tracks. Such low band converted carrier chrominance signal is supplied from the frequency converting circuit 18 to another input of the adding circuit 19 in which it is added to the FM-luminance signal, whereupon the resulting output of the adding circuit 19 is applied to the rotary head 20 for recording by the latter on the magnetic tape 21 with, as before, one field of the video signal being recorded in each slant track on the magnetic tape.

In the reproducing mode of the embodiment of this invention illustrated on FIG. 3, the signal recorded in a slant track on the magnetic tape 21 is reproduced by the rotary head 20 scanning such track and is supplied to the high-pass filter 22 in the reproduced signal processing system 2" so as to derive the FM-luminance signal Y from the reproduced signal. The reproduced signal is also supplied to the low-pass filter 23 in the reproduced signal processing circuit 2" so as to separate or extract the low band converted carrier chrominance signal C therefrom. The FM-luminance signal Y from the high-pass filter 22 is demodulated by the FM-demodulator 24 so as to provide a luminance signal which includes crosstalk components from the tracks adjacent the track scanned by the rotary head 20. Such output from the FM-demodulator 24 is supplied through the deemphasis circuit 25 to one input of an adding circuit 46.

The low band converted carrier chrominance signal C from the low-pass filter 23 is supplied through the ACC circuit 28 to a frequency converting circuit 58 in which it is reconverted to a signal having the original subcarrier frequency, for example, 3.58 MHz in the case of a signal according to the NTSC system. The reconverted carrier chrominance signal contains, in addition to the carrier chrominance signal reproduced from the track being scanned, chrominance crosstalk components from the adjacent tracks. Such output from the frequency converting circuit 58 is supplied to another input of the adding circuit 46.

The added output from the adding circuit 46, that is, the result of adding the luminance signal and luminance crosstalk components from deemphasizing circuit 25 and the carrier chrominance signal and crosstalk components thereof from frequency converting circuit 58, is supplied to one input of each of two subtracting circuits 70 and 80, and is also supplied to the contact 5b of the switch 5. In the reproducing mode of the apparatus shown on FIG. 3, the switch 5 is changed-over to engage its contact 5b and thereby supply the added output from the adding circuit 46 to the A/D converter 6 in which it is converted to a digital signal. Such digital signal from the converter 6 is supplied to the line memory 9 in which it is processed to provide a corresponding 1H delayed signal (1HD). Such 1H delayed signal (1HD) is supplied to the contact 40b of the switch 40 which is engaged in the reproducing mode so as to supply the 1H delayed signal to the D/A converting circuit 11 for reconverting to an analog signal. The resulting analog signal obtained from the converting circuit 11 is supplied to another input of the subtracting circuit 70 and includes chrominance crosstalk components in addition to the analog luminance signal Y. As a result, the output of the subtracting circuit 70 is comprised of the carrier chrominance signal C along with the luminance crosstalk components. Such output from the subtracting circuit 70 is supplied to a trap circuit 51 which traps the band of the carrier chrominance signal so that only the crosstalk component of the luminance signal passes through the trap circuit 51. This crosstalk component of the luminance signal is supplied to one input of a subtracting circuit 52 while its other input is supplied with the output of the deemphasis circuit 25 which is comprised of the luminance signal and the crosstalk component of the luminance signal. Thus, the crosstalk component of the luminance signal is eliminated by the subtracting circuit 52 which, at its output, provides the luminance signal Y alone.

In the reproducing mode, in the case of the NTSC system, the switch 45 engages its contact $45_{b1}$ to permit the 1H delayed signal (1HD) to be supplied from the line memory 9 to the D/A converting circuit 16 by way of the contact 40b of the switch 40 and the contact $45_{b1}$ of the switch 45. On the other hand, in the reproducing mode for the case of the PAL system, the switch 45 engages its contact $45_{b2}$ to permit the 2H delayed signal (2HD) to be supplied from the line memory 9 by way of the contact $45_{b2}$ of the switch 45 to the D/A converting circuit 16.

The signal converted to an analog signal by the D/A converting circuit 16 is supplied to the other input of the subtracting circuit 80 and is comprised of the luminance signal along with crosstalk components of the carrier chrominance signal. Thus, the subtracting circuit 80 provides, as its output, the carrier chrominance signal along with the crosstalk components of the luminance signal, with such output of the subtracting circuit 80 being supplied to a band pass filter 53 which passes only the carrier chrominance signal C. The carrier chrominance signal C from the band pass filter 53 and the luminance signal Y from the subtracting circuit 52 are supplied to respective inputs of an adding circuit 54 which provides, at its output, a color video signal supplied to an output terminal 55. An automatic phase control (APC) circuit 56 also receives the carrier chrominance signal C from the band pass filter 53 and, in response thereto, phaselocks the frequency converting circuit 58.

It will be appreciated that, in the embodiment of the invention described above with reference to FIG. 3, in the reproducing mode, the A/D converting circuit 6, the line memory 9 and the D/A converting circuits 11 and 16 in the imager signal processing system 1" combine with the adding circuit 46 and the subtracting circuits 70 and 80 in the reproduced signal processing circuit 2" to constitute the comb filter for such reproduce signal processing circuit. Thus, once again, a relatively simplified circuit arrangement of reduced cost and power consumption is provided.

It will be appreciated that, in the embodiment of the invention shown in FIG. 3, if desired the calculations, such as, the subtraction carried out by the above described comb-filter, may be carried out in respect to digital signals, that is, prior to the D/A converting circuits 11 and 16. Further, in cancelling the crosstalk components in the reproducing mode, two A/D converters may be used for independently A/D-converting the luminance signal and the carrier chrominance signal, respectively, rather than utilizing the A/D converting circuit 6 for A/D-converting the added signal from the adding circuit 46, that is, the addition of the luminance signal and the carrier chrominance signal, which is supplied to the converting circuit 6 by way of the switch 5 in the reproducing mode.

Furthermore, although in the embodiment of FIG. 3 both the luminance signal and the carrier chrominance signal are processed by the line memory 9, it is only necessary, in accordance with the present invention, that at least one of the luminance signal and the carrier chrominance signal be processed by the line memory. In addition to employing the line memory 9 of the imager signal processing circuit 1″ as a part of the comb filter required for the reproduced signal processing circuit 2″, the aperture control circuit 48 of the imager signal processing circuit can also serve in the reproduced processing circuit.

Although preferred embodiments of the invention have been described in detail herein with reference to the accompanying drawings, it is to be understood that the present invention is not limited to those precise embodiments, and that various changes and modifications can be effected therein by one skilled in the art without departing from the spirit or scope of the invention as defined in the appended claims.

What is claimed is:

1. The combination of a video camera having imager means providing an imager signal corresponding to an object in a field of view of the camera, a magnetic recording and reproducing device integrated with said video camera, and apparatus for processing a video signal comprising:

analog-to-digital converting means for converting said imager signal to digital form;

means for supplying to said analog-to-digital converting means for sampling clock having a frequency which is four times a color subcarrier frequency;

imager signal processing means for processing the digital imager signal and including line delay means for delaying the digital imager signal, means for producing a luminance signal from said digital imager signal and delayed versions thereof from said line delay means, means for producing a chrominance signal from said digital imager signal and said delayed versions thereof from said line delay means, and means for encoding said chrominance signal into a carrier chrominance signal;

digital-to-analog converting means for converting said luminance and carrier chrominance signals from digital to analog form;

means for operative in a recording mode for recording said luminance and chrominance signals of analog form on a magnetic medium, said means for recording including FM-modulating means frequency modulating a carrier with said luminance signal, and means for combining the resulting FM-luminance signal with said carrier chrominance signal situated in a low band below the band of said FM-luminance signal;

means operative in a reproducing mode for reproducing said luminance and chrominance signals of analog form from said magnetic medium;

means for applying at least one of the reproduced luminance and chrominance signals to said line delay means through said analog-to-digital converting means; and means for obtaining a composite video signal from an output of said line delay means and from the one of said reproduced luminance and chrominance signals applied to said line delay means.

2. The combination according to claim 1; wherein said means for recording includes frequency converting means operative in said recording mode for frequency converting said carrier chrominance signal to said low band.

3. The combination according to claim 1; wherein said encoder means includes means selectively operative in said recording and reproducing modes to encode said chrominance signal with a carrier having a frequency in said low band and with a standard color subcarrier, respectively, so that said encoder means functions as a part of said imager signal processing means in said recording mode and as a part of said means for reproducing in said reproducing mode.

4. The combination according to claim 1; wherein said chrominance signal modulates a carrier signal for low frequency converting in said encoder means.

5. The combination according to claim 1; wherein said magnetic recording and reproducing device includes head means scanning successive tracks on said magnetic medium for recording a field of said luminance and chrominance signals in each of said tracks when scanning the latter in said recording mode; and said means for reproducing comprises comb filter means in which said line delay means is included in said reproducing mode for eliminating, from the luminance and chrominance signals picked-up by said head means when scanning one of said tracks, any cross-talk components picked-up from tracks adjacent said one track.

6. The combination according to claim 5, wherein said imager signal processing means includes means receiving an output of said delay means in said recording mode for compensating an aperture of said imager means.

7. The combination according to claim 1; wherein said imager signal processing means includes means receiving an output of said delay means in said recording mode for compensating an aperture of said imager means.

8. The combination according to claim 1; wherein said imager means includes a charge-coupled device.

* * * * *